US012809313B2

(12) United States Patent
Cusin et al.

(10) Patent No.: US 12,809,313 B2
(45) **Date of Patent: *Nov. 24, 2026**

(54) BALANCE-SPRING FOR A HOROLOGICAL RESONATOR MECHANISM PROVIDED WITH MEANS FOR ADJUSTING FLEXIBILITY AND ASSOCIATED MATERIALS

(71) Applicant: Omega SA, Bienne (CH)

(72) Inventors: Pierre Cusin, Villars-Burquin (CH); Gianni Di Domenico, Neuchatel (CH)

(73) Assignee: Omega SA, Bienne (CH)

( * ) Notice: Subject to any disclaimer, the term of this patent is extended or adjusted under 35 U.S.C. 154(b) by 328 days.

This patent is subject to a terminal disclaimer.

(21) Appl. No.: 18/536,500

(22) Filed: Dec. 12, 2023

(65) Prior Publication Data

US 2024/0201629 A1 Jun. 20, 2024

(30) Foreign Application Priority Data

Dec. 15, 2022 (EP) ..................................... 22213757

(51) Int. Cl.
*G04B 17/06* (2006.01)

(52) U.S. Cl.
CPC ........... *G04B 17/06* (2013.01); *G04B 17/066* (2013.01)

(58) Field of Classification Search
None
See application file for complete search history.

(56) References Cited

U.S. PATENT DOCUMENTS 3,934,406 A * 1/1976 Bornand ................ G04B 17/32 368/177
2014/0286145 A1 9/2014 Stranczl et al.
2020/0033804 A1 * 1/2020 Di Domenico ........ G04B 31/06

(Continued)

FOREIGN PATENT DOCUMENTS

| | | | |
|---|---|---|---|
| EP | 2 781 969 | A1 | 9/2014 |
| EP | 4 009 115 | A1 | 6/2022 |
| JP | 2022-88332 | A | 6/2022 |

OTHER PUBLICATIONS

European Search Report issued May 22, 2023 in European Application 22213757.2 filed on Dec. 15, 2022, 3 pages (with English Translation of Categories of Cited Documents).

(Continued)

*Primary Examiner* — Edwin A. Leon
*Assistant Examiner* — Matthew Daniel Hwang
(74) *Attorney, Agent, or Firm* — Oblon, McClelland, Maier & Neustadt, L.L.P.

(57) ABSTRACT

A balance-spring, in particular for a horological resonator mechanism, the balance-spring including a flexible strip coiled on itself into several coils, the strip having a predefined flexibility, the balance-spring including a device for adjusting its flexibility, the adjustment device including an elastic element in direct contact with the strip, the elastic element preferably having a flexibility less than that of the strip, the adjustment device including a prestressing device to apply a variable force or torque to the elastic element, so as to vary the flexibility of the elastic element, the elastic element and the strip being separate and assembled with each other. An horological resonator mechanism including such a balance-spring is also disclosed.

14 Claims, 1 Drawing Sheet

(56) References Cited

U.S. PATENT DOCUMENTS

| | | | | |
|---|---|---|---|---|
| 2021/0109483 | A1* | 4/2021 | Jeanneret | G04D 3/0089 |
| 2022/0171336 | A1 | 6/2022 | Kahrobaiyan | |
| 2023/0393528 | A1* | 12/2023 | Helfer | G04B 17/325 |

OTHER PUBLICATIONS

Office Action issued Dec. 3, 2024, in corresponding Japanese Patent Application No. 2023-202907, 4 pages.

* cited by examiner

BALANCE-SPRING FOR A HOROLOGICAL RESONATOR MECHANISM PROVIDED WITH MEANS FOR ADJUSTING FLEXIBILITY AND ASSOCIATED MATERIALS

CROSS-REFERENCE TO RELATED APPLICATION

This application claims priority to European Patent Application No. 22213757.2 filed on Dec. 15, 2022, the entire disclosure of which is hereby incorporated herein by reference.

TECHNICAL FIELD OF THE INVENTION

The invention relates to a balance-spring for a horological resonator mechanism, the balance-spring being provided with means for setting the flexibility of said balance-spring. The invention also relates to a horological resonator mechanism provided with such a balance-spring.

Technological Background

Most current mechanical watches are provided with a sprung balance and an escapement mechanism of the Swiss pallets type. The sprung balance forms the time base of the watch. It also referred to as a resonator mechanism or regulating organ.

In turn, the escapement fills two main functions:

sustaining the reciprocating movements of the resonator;

counting these reciprocating movements.

To form a mechanical resonator, an inertial element, a guide and an elastic return element are necessary. Conventionally, a balance-spring acts as an elastic return element for the inertial element formed by a balance. This balance is rotatably guided by pivots which rotate in plain bearings made of ruby.

In general, the sprung balance should be capable of being set to improve the precision of a watch. For this purpose, means for setting the flexibility of the balance-spring are used, such as an index for modifying the effective length of the spring. Thus, its flexibility is modified to adjust the running precision of the watch. Nonetheless, the effect of a conventional index for adjusting the running remains limited, and it is not always effective for making the setting precise enough, in the range of a few seconds or a few tens of seconds per day.

For finer adjustment of running, there are setting means comprising one or more screw(s) arranged in the felloe of the balance. By acting on the screws, the inertia of the balance is modified, which results in modifying the running thereof.

However, this setting method is not easy to perform, and still does not make it possible to obtain enough fineness of setting of the running of the oscillator.

To enhance the fineness of setting, it was proposed in a previous application (EP22177059.7), to add means for adjusting the flexibility of a balance-spring, the adjustment means comprising an elastic element arranged in series with a coiled flexible strip. The elastic element is subjected to a variable prestress to modify its flexibility, and thus to be able to adjust the running of the regulating organ.

By acting on the prestressing means, the force or the torque applied to the elastic element is modified, which results in a modification of the flexibility of the assembly comprising the elastic element and the strip. Indeed, the elastic element placed in series with the strip adds an additional flexibility to the strip, which is combined with that of the strip. Thus, when the prestressing means apply a variable force or torque on the elastic element, they modify the flexibility of the elastic element and therefore of the assembly comprising the strip without modifying the flexibility of the strip, the end of which substantially retains the same position, regardless of the variable force or torque applied to the elastic element.

This balance-spring is particularly provided in one piece, and made from the same material, for example silicon, to facilitate its production.

For the assembly of the one-piece balance-spring in the movement, it is generally provided to glue certain parts of the balance-spring to the plate or a plate cock, particularly on one or more balance-spring studs. In particular, the elastic element needs to be connected to the plate via the fixed support to be able to produce the prestress on the elastic element.

However, in the long term, such a prestress is liable to induce a distortion of the glue connecting the fixed support to the balance-spring stud, which can result in a setting defect of the adjustment means, or to a detachment of the fixed support from the balance-spring stud.

Other assembly methods, for example driving or screwing, cannot be used with certain materials, such as silicon, which is a more fragile, and therefore brittle, material. Indeed, the stress induced in the material by driving or screwing weaken, or even directly break the elastic element with such a material.

SUMMARY OF THE INVENTION

The present invention aims to overcome all or part of the aforementioned drawbacks, by providing a balance-spring provided with effective and precise setting means, configured in particular to be capable of being assembled long-term to the plate of a horological movement.

To this end, the invention relates to a balance-spring for a horological resonator mechanism, the balance-spring comprising a flexible strip coiled on itself into several coils, the strip having a predefined flexibility, the balance-spring including means for adjusting its flexibility, the adjustment means including an elastic element arranged in series with the strip, the elastic element connecting one end of said strip to a fixed support, so as to add an additional flexibility to the strip, the elastic element preferably having a flexibility less than that of the strip, the adjustment means including prestressing means to apply a variable force or torque to the elastic element, preferably without substantially modifying the position of the end of the strip, so as to vary only the flexibility of the elastic element.

The invention is remarkable in that the elastic element and the strip are separate and assembled with one another by assembly means.

Thanks to the invention, it is possible to manufacture the strip and the elastic element independent of one another, and connect them by assembly means. It is therefore possible to choose different materials for the flexible strip and for the elastic element. For example, a stronger first material can be chosen for the elastic element, in order to be able to use more resistant assembly means than glue.

Thus, it is possible to use assembly methods such as driving or screwing to assemble the elastic element with a balance-spring stud, without any risk of it being damaged or breaking. Furthermore, the use of glue which produces a less durable assembly is avoided.

On the other hand, a less resistant material can be used for the balance-spring strip, such as silicon or silicon oxide, this material having other advantageous properties, particularly amagnetic properties.

In this case, glue can be used to assemble the flexible strip with the elastic element, because the assembly junction between the strip and the elastic element is not subjected to the prestressing means.

According to a particular embodiment of the invention, the elastic element is formed from a first material supporting assembly means generating stress induced in the first material, such as driving or screwing.

According to a particular embodiment of the invention, the prestressing means are formed from the first material.

According to a particular embodiment of the invention, the first material is to be chosen from metals or metal alloys, such as nickel-silver, CuBe2, steel or nickel-based alloys (Ni, NiP, NiW), or materials for LIGA type processes, such as alloys based on Ni, based on CuNiSn, or a maraging type steel.

According to a particular embodiment of the invention, the strip is formed from a second material different from the first material, for example including silicon or silicon oxide, preferably entirely.

According to a particular embodiment of the invention, the second material is of Nivarox CT® type or of Nivachron® type.

According to a particular embodiment of the invention, the strip and the elastic elements are assembled by gluing as assembly means.

According to a particular embodiment of the invention, the elastic element is arranged at an outer end of the strip.

According to a particular embodiment of the invention, the elastic element comprises a flexible guide provided with at least one flexible blade, preferably two uncrossed blades, and with a movable rigid part to which the strip is connected.

According to a particular embodiment of the invention, the torque or force is continuously adjustable by the prestressing means.

According to a particular embodiment of the invention, the prestressing means comprise a secondary flexible blade connected to the elastic element.

According to a particular embodiment of the invention, the prestressing means comprise a lever to adjust the variable force or torque.

According to a particular embodiment of the invention, the elastic element is arranged in series in line with the strip.

According to a particular embodiment of the invention, the balance-spring extends substantially in one plane.

According to a particular embodiment of the invention, the adjustment means can be actuated when the balance-spring is mounted on a plate of a horological movement.

The invention also relates to a rotary resonator mechanism, in particular for a horological movement, including an oscillating mass and such a balance-spring.

According to a particular embodiment of the invention, the elastic element is assembled with at least one balance-spring stud, for example by driving or screwing.

BRIEF DESCRIPTION OF THE FIGURES

The aims, advantages and features of the present invention will become apparent upon reading several embodiments given only as non-limiting examples, with reference to the appended drawings wherein.

DETAILED DESCRIPTION OF THE INVENTION

Figure 1:
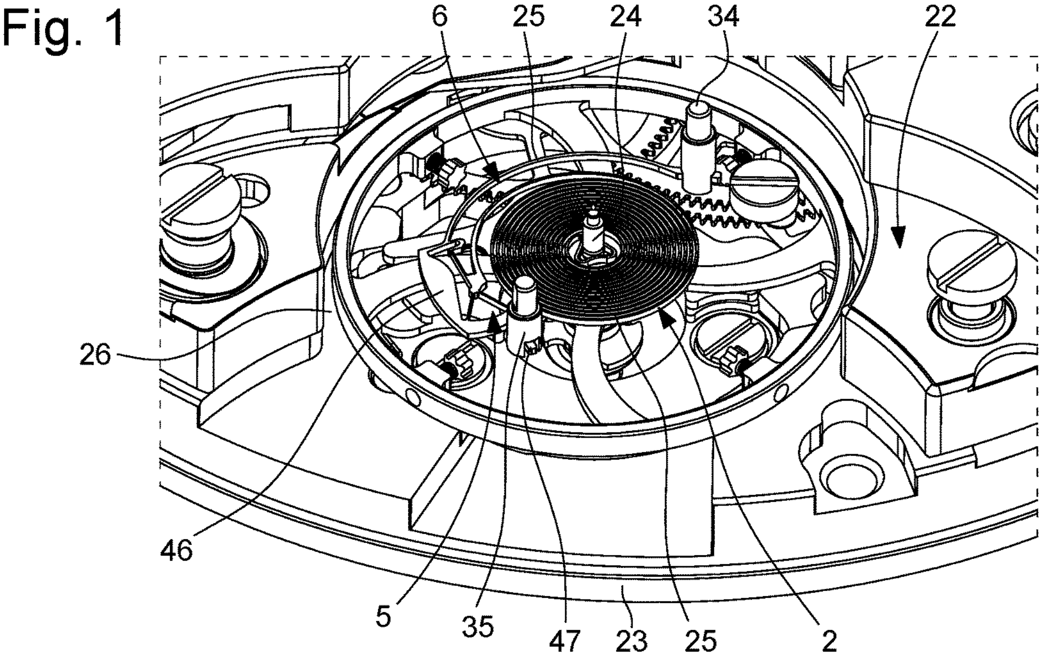
FIG. 1 schematically represents a perspective view of a part of a regulating organ comprising a balance-spring according to an embodiment of the invention, the regulating organ being arranged in a horological movement, and FIG. 2 schematically represents a top view of the balance-spring of the regulating organ of FIG. 1.

FIG. 1 shows a schematic representation of an embodiment of a resonator mechanism or regulating organ 1 arranged in a horological movement 10. The horological movement 10 comprises a plate 21, an inertia-block, an elastic return element of the inertia-block configured to oscillate it, and a balance cock 22.

The regulating organ 1 further comprises an annular balance 23 as inertia-block, a balance shaft 24 and a balance-spring 25 as elastic return element.

The plate 21 is provided with a housing 26 to receive the regulating organ 1, wherein the balance 23, the balance-spring 25, the balance cock 22 are superposed from the bottom up. The balance shaft 24 is centred in the housing 26 and passes through the centre of the balance 22, the balance-spring 25 and the balance cock 22. The balance shaft 24 is held by two shockproof bearings 28 arranged at both ends of the balance shaft 24. A first bearing is arranged at the bottom of the housing 26, and the second bearing 28 is arranged on top of the housing 26, and is held by the balance cock 22, the balance cock 22 passing through the top of the housing 26 via the central axis of the housing 26. The balance cock 22 is provided with a through hole wherein the second bearing 28 is held.

Figure 2:
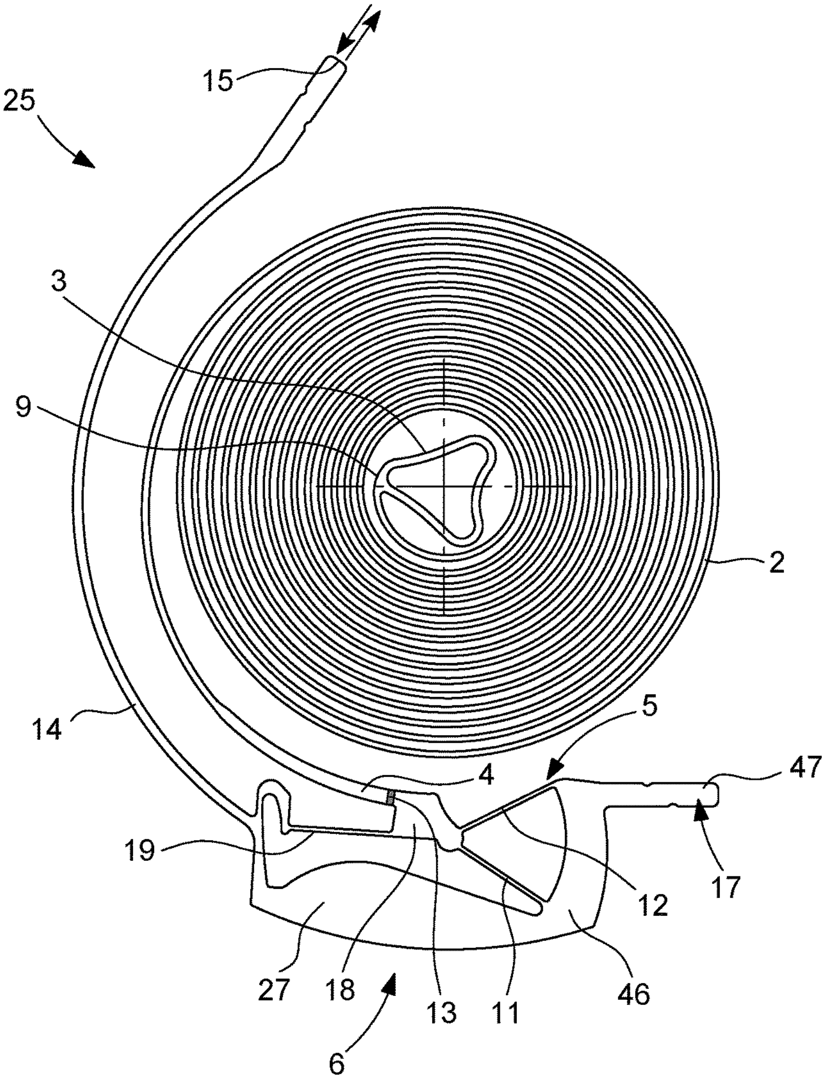

Represented in FIGS. 1 and 2, the balance-spring 25 extends preferably substantially in one plane. The balance-spring 25 comprises a flexible strip 2 coiled on itself into several coils, the strip 2 having a predefined flexibility. The inner end 9 of the strip 2 is integral or assembled with a support 3. The support 3 has a substantially triangular shape, and is threaded around the shaft of the balance 23.

The balance-spring 25 further includes means for adjusting its flexibility. For example, the adjustment means can in particular be actuated by a user when the regulating organ is mounted on a plate of the horological movement.

The adjustment means include an elastic element 5 arranged in series with the strip 2, the elastic element 5 connecting one end 4, 9 of said strip 2 to a fixed support 17, and secured to one of the ends 4, 9 of the strip 2. The elastic element 5 is secured to the outer end 4 of the strip 2. The inner end 9 of the strip 2 is assembled with a support 3 of an oscillating mass of the resonator. The elastic element 5 is a different element from the strip 2. The fixed support 17 is fixed relative to the plate 21.

The elastic element 5 adds additional flexibility to that of the strip 2. Preferably, the elastic element 5 has a flexibility less than that of the strip 2. The elastic element 5 is here arranged in line with the strip 2.

The elastic element 5 of the balance-spring 25 comprises a flexible-blade guide comprising at least one flexible blade. The guide comprises here two uncrossed flexible blades 11, 12 and a rigid part 18. The flexible blades 11, 12 are joined, on one hand, laterally to a fixed support 17, and, on the other, to the rigid part 18 moving them closer together. Thus, preferably, the flexible blades 11, 12 move apart from the rigid part 18 to the fixed support 17. The outer end 4 of the strip 2 is joined to the rigid part 18. The fixed support 17 is stationary relative to the movement 10. The fixed support 17 has an L shape, a first arm 46 of the L serving as a link with the flexible blades 11, 12, the second arm 47 of the L being oriented on the opposite side to the uncrossed-strip guide to be able to be assembled with the horological movement 10.

The adjustment means of the balance-spring 25 further include prestressing means 6 to apply a variable force or torque to the elastic element 5. Thus, the flexibility of the balance-spring can be adjusted. The torque or force is continuously adjustable by the prestressing means 6. In other words, the torque or force is not restricted to isolated values. Thus, it is possible to adjust the flexibility of the elastic element 5 with high precision.

The prestressing means 6 include a secondary flexible strip 19, arranged on an opposite side of the rigid part 18 in line with the uncrossed-strip guide. The secondary flexible strip 19 is disposed tangentially to the strip 2, at the outer end 4.

The secondary flexible strip 19 is connected by the other end to a curved lever 14 partially bypassing the strip 2. The lever 14 is connected, in addition to the secondary flexible blade 19, to a semi-rigid structure 27 connected to the fixed support 17. The semi-rigid structure 27 is partially distorted when the lever 14 is actuated by the force or torque.

The force or torque is exerted on the free end 32 of the lever 14. Thus, the lever 14 of the prestressing means 6 transmits the variable force or torque to the elastic element 5 via the secondary flexible strip 19 and the semi-rigid structure 27, so as to modify the flexibility of the balance-spring 25.

According to the invention, the elastic element 5 and the strip 2 are separate, and are assembled with each other by assembly means. The assembly means are for example glue.

Preferably, the elastic element 5 is formed from a first material withstanding assembly processes generating stress induced in the first material, such as driving or screwing.

Driving is a process wherein a first piece is at least partially force-fitted in a housing of a second piece, and is held by friction in the housing. In other words, the housing clamps the part of the first piece.

Screwing is a process wherein two pieces are kept assembled thanks to a screw, which partially passes through the first and second piece to hold them together.

The first material is preferably to be chosen from metals or metal alloys, such as nickel-silver, CuBe2, steel, nickel or nickel-based alloys, for example nickel phosphorus NiP or nickel-tungsten NiW, or materials for LIGA type processes, such as alloys based on Ni, based on Co, based on CuNiSn, or a maraging type steel. An example of cobalt-based spring allow is Phynox®, a maraging steel is Durnico®, and a CuNiSn alloy is ToughMet®.

Such materials can withstand stress induced by assembly processes, such as driving or screwing.

Preferably, the flexible strip 2 is formed from a second material different from the first material.

Preferably, the strip 2 is one-piece, and possibly formed from the same material. For example, the second material includes mostly silicon or silicon oxide, preferably entirely. Thus, the flexible strip 2 has the amagnetic properties of silicon. Alternatively, the second material is of Nivarox CT® type or of Nivachron® type, which are well-known to a person skilled in the art of watchmaking.

In a particular example, the prestressing means 6 are also formed from the first material. Thus, the prestressing means 6 and the elastic element 5 are more resistant and can be assembled with processes such as driving or screwing.

These assembly means withstand the force or torque produced by the prestressing means 6 better.

The same applies with the free end 15 of the lever 14, which cooperates with the first balance-spring stud 34. The first balance-spring stud includes a housing making it possible to press the free end therein.

The strip 2 and the elastic element 5 are assembled with each other at a junction 13 by gluing. The outer end 4 of the strip 2 is glued to the rigid part 18 of the flexible-strip guide of the elastic element 5 at the junction 13. The rigid part 18 includes for example a housing wherein the outer end 4 of the strip 2, which is held thanks to gluing, is inserted.

The second material, for example silicon or silicon oxide, being more fragile than the first material, the outer end 4 cannot be pressed into the housing.

In this situation, gluing is sufficient, as it is not subjected to the force or torque produced by the prestressing means 6, which is only exerted on the elastic element 5.

The elastic element 5 and the strip 2 are manufactured with different processes according to the two materials.

The elastic element 5 and/or the prestressing means 6 are produced, for example by a wire erosion process, by a laser machining process or a laser-water jet coupling, or by a LIGA type lithography process.

The strip 2 formed in the second material is for example produced by a DRIE type deep reactive-ion etching process, in particular to obtain a silicon balance-spring.

In the variant of the balance-spring made from an identical material, for example silicon, the process is preferably a DRIE type deep reactive-ion etching process.

To be able to modify the variable force or torque on the balance-spring 25, in particular on the elastic element 5, a first balance-spring stud 34 and a second balance-spring stud 35 have been represented, which are for example arranged substantially symmetrically relative to the balance shaft 24.

The first balance-spring stud 34 cooperates with the free end 15 of the lever 14, and the second balance-spring stud 35 cooperates with the second arm 47 of the fixed support 17.

The second balance-spring stud 35 includes a housing wherein the second arm 47 is inserted and force-held by friction or by pressing.

Alternatively, the second arm 47 is held in the second balance-spring stud 35 by means of a screw, not shown in the figures.

The two balance-spring studs 34, 35 are arranged on either side of the prestressing means 6 and the elastic element 5. Furthermore, the two balance-spring studs 34, 35 are rigidly connected to the lever 14 and to the fixed support 17. In other words, the first 34 and the second balance-spring stud 35 are respectively secured to the lever 14 and the fixed support 17. The assembly of the balance-spring studs and the balance-spring 25 is for example performed by gluing, brazing, soldering, by metallic glass distortion, or by a mechanical fastening.

The movement of the first balance-spring stud 34 relative to the second balance-spring stud 35 modifies the flexibility of the elastic element 5, because the movement exerts a more or less substantial force or torque on the lever 14 of the prestressing means 6, such that the flexibility of the elastic element 5 varies, and thus the flexibility of the entire balance-spring 25.

A setting device, not shown in the figures, and which is not part of the invention, makes it possible to move the first balance-spring stud 34 relative to the second balance-spring stud 35 to modify the torque or force applied to the flexible element 5.

Of course, the invention is not limited to the embodiments described with reference to the figures and variants could be considered without departing from the scope of the invention.

The invention claimed is:

1. A balance-spring for a horological resonator mechanism, the balance-spring comprising:

a flexible strip coiled on itself into several coils, the strip having a predefined flexibility; and adjustment means for adjusting the flexibility of the balance-spring, the adjustment means including an elastic element arranged in series with the strip, the elastic element connecting one end of said strip to a fixed support, so as to add an additional flexibility to the balance-spring, the elastic element having a flexibility less than the flexibility of the strip, wherein the adjustment means includes prestressing means to apply a variable force or torque to the elastic element, without modifying a position of an end of the strip, so as to vary only the flexibility of the elastic element, and wherein the elastic element and the strip are separate and assembled with each other by assembly means.

2. The balance-spring according to claim 1, wherein the elastic element is formed from a first material withstanding assembly processes generating stress induced in the first material.

3. The balance-spring according to claim 2, wherein the prestressing means are formed from the first material.

4. The balance-spring according to claim 2, wherein the strip is formed from a second material different from the first material, and wherein the second material is silicon or silicon oxide.

5. The balance-spring according to claim 2, wherein the first material is to be chosen from metals or metal alloys, or nickel-based alloys, or materials for LIGA type processes.

6. The balance-spring according to claim 5, wherein the first material chosen from metals or metal alloys is nickel-silver, CuBe2, steel or nickel-based alloys (Ni, NiP, NiW), and wherein the materials for LIGA type processes are alloys based on Ni, based on Co, based on CuNiSn, or a maraging type steel.

7. The balance-spring according to claim 1, wherein the strip and the elastic element are assembled by gluing.

8. The balance-spring according to claim 1, wherein the elastic element is arranged at an outer end of the strip.

9. The balance-spring according to claim 1, wherein the elastic element comprises a flexible guide provided with at least one flexible blade, and with a movable rigid part to which the strip is connected.

10. The balance-spring according to claim 1, wherein the torque or force is continuously adjustable by the prestressing means.

11. The balance-spring according to claim 1, wherein the prestressing means comprise a secondary flexible blade connected to the elastic element.

12. The balance-spring according to claim 1, wherein the prestressing means comprise a lever to adjust the variable force or torque.

13. A rotary resonator mechanism for a horological movement, including an oscillating mass, wherein the mechanism comprises the balance-spring according to claim 1.

14. A horological movement, including a plate and the resonator mechanism according to claim 13, wherein the elastic element is assembled with at least one balance-spring stud.

* * * * *